United States Patent
Benkeser et al.

[15] 3,699,141
[45] Oct. 17, 1972

[54] NOVEL PROCESS FOR MAKING HALOSILYL CARBON COMPOUNDS AND NOVEL HALOSILYL CARBON COMPOUNDS PRODUCED THEREBY

[72] Inventors: Robert A. Benkeser, W. Lafayette, Ind.; William E. Smith, Cambridge, Mass.

[73] Assignee: Purdue Research Foundation, Lafayette, Ind.

[22] Filed: March 10, 1970

[21] Appl. No.: 18,330

[52] U.S. Cl....260/448.2 R, 260/46.5 R, 260/448.2 E
[51] Int. Cl..............................C07f 7/04, C07f 7/12
[58] Field of Search..................260/448.2 E, 448.2 R

[56] References Cited

OTHER PUBLICATIONS

Chemical Abstracts, 51, p. 4982b, 1957.
Chemical Abstracts, 70, p. 115218q, 1969.
Sommer et al., JACS, 68, p. 485 (1946).
Petrov et al., Zh. Obsch. Khim. 25, p. 2469 (1955).

*Primary Examiner*—Delbert E. Gantz
*Assistant Examiner*—P. F. Shaver
*Attorney*—Aldo John Cozzi, Reynold J. Finnegan, George A. Skoler and Eugene C. Trautlein

[57] ABSTRACT

Novel process for producing halosilyl carbon compounds by reacting, under anhydrous conditions in the presence of a tertiary amine, a trihalosilane having one silicon-bonded hydrogen atom per molecule with a carbon compound having oxygen bonded only to carbon, such as an aldehyde or ketone, to exchange the oxygen bonds with a carbon to silicon bond and a carbon to hydrogen bond. A normally liquid organic nitrile solvent which does not substantially chemically combine with the reactants or products of the process can be used.

Novel halosilyl carbon compounds having the formula:

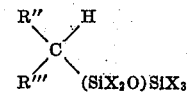

wherein R" is selected from the class consisting of alkaryl groups and haloalkyl groups, R'" is selected from the class consisting of hydrogen and aryl groups, X is halogen and $n$ is 0 or 1. The novel compounds can be transformed by known methods into resinous siloxanes useful as, for example, potting compositions.

36 Claims, No Drawings

NOVEL PROCESS FOR MAKING HALOSILYL CARBON COMPOUNDS AND NOVEL HALOSILYL CARBON COMPOUNDS PRODUCED THEREBY

This invention relates to a novel process for producing halosilyl carbon compounds and to novel halosilyl carbon compounds produced thereby. More particularly, this invention relates to the production of halosilyl carbon compounds, in which a halosilyl group and hydrogen are bonded to a single carbon atom of the carbon compound, by means of a unique reaction involving the reductive silylation of carbon compounds having oxygen bonded only to carbon, for example, as in aldehydes, ketones, or carboxylic acid chlorides, to replace the two carbon to oxygen bonds connecting carbon with a single oxygen atom in the carbon compound with a halosilyl group and hydrogen atom. In the reductive silylation provided by this invention, at least one hydrogen to silicon bond of a trihalosilane having one silicon-bonded hydrogen per molecule is reacted with two carbon to oxygen bonds connecting a single oxygen atom to carbon of a carbon compound to effect an exchange of a hydrogen to carbon bond and a silicon to carbon bond for said two carbon to oxygen bonds. The process of this invention is highly useful in the production of diverse organo-trihalosilanes quickly, easily and relatively inexpensively.

We know of no previously known process which utilizes the highly unique reductive silylation as explained above for the formation of the carbon to silicon bond in the production organo-halosilanes.

One previously known method for forming the silicon to carbon bond is the reaction of a halosilane, such as a chlorosilane, with an organometallic compound, such as Grignard reagent. This method is very unsuitable for making halosilanes, i.e., silanes containing halogen to silicon bonds because such bonds are highly susceptible to replacement by the organometallic reagent. At best, complex and difficult-to-separate mixtures result.

Other previously known methods for forming the silicon to carbon bond are the direct synthesis reactions of alkyl halides with silicon, and high temperature condensations involving appropriate alkyl halides with trichlorosilanes. These direct synthesis reactions and high temperature condensations require complex, expensive equipment and are limited to the use of reactants and the production of products having great thermal stability.

Another previously known method for forming the silicon to carbon bond is the reaction of diazoalkanes with chlorosilanes. This method is severely limited in the types of silanes which it is capable of producing and is especially limited by the unavailability of diverse types of diazoalkanes. This method also is severely limited because of the hazardous nature of diazoalkanes.

In still another previously known method, hydrosilanes are chemically added to aliphatically unsaturated groups either thermally or catalytically. This method is economically limited to the production of alkyl silanes and vinyl silanes and is not useful for the production of diverse organohalosilanes.

This invention provides a new route to the manufacture of halosilyl carbon compounds having the carbon to silicon bond. It provides a unique reaction in which two carbon to oxygen bonds, as in the carbonyl oxygen, are replaced by the trihalosilyl moiety and, generally, hydrogen.

The process of this invention is simple and facile to carry out and no specialized or complex, expensive equipment is required. The novel process produces high yields of the desired halosilyl carbon compounds which are easily recovered from the reaction mixture using conventional separation techniques, such as, extraction, precipitation, and/or distillation. In addition, the starting materials used in this process are, for the most part, relatively inexpensive and readily available. The process of this invention is particularly advantageous in permitting the synthesis of a wide variety of substituted and unsubstituted diarylmethyltrihalosilanes, e.g., benzhydryltrichlorosilane, and substituted and unsubstituted arylmethyltrihalosilanes, e.g., benzyltrichlorosilane.

The process of this invention involves the reaction, under anhydrous conditions in the presence of a tertiary amine, at least one hydrogen to silicon bond of a trihalosilane having one hydrogen atom bonded to silicon with one of two carbon to oxygen bonds connecting carbon, preferably a single carbon, with a single oxygen atom of a carbon compound containing oxygen bonded only to carbon to effect an exchange of a silicon to carbon bond for a carbon to oxygen bond. Generally, this reaction also effects the replacement of the other of said two carbon to oxygen bonds with a hydrogen to carbon bond.

A typical reaction according to this invention can be illustrated by the following equation:

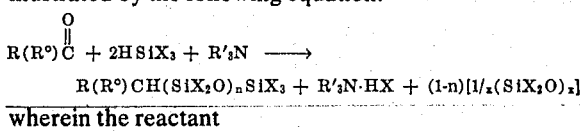

$$R(R°)CH(SiX_2O)_nSiX_3 + R'_3N \cdot HX + (1-n)[1/x(SiX_2O)_x]$$

wherein the reactant

is the carbon compound, the reactant $HSiX_3$ is the trihalosilane, $R'_3N$ is the tertiary amine, $R(R°)CH(SiX_2O)_nSiX_3$ is the halosilyl carbon compound product wherein $n$ is an integer of 0 to 1, $R'_3N \cdot HX$ is a tertiary amine hydrochloride by-product and $1/x(SiX_2O)_x$ is a dihalosiloxy cyclic polymer believed to be obtained as by-product in which $x$ is an integer of, for example, three or four or more and which is obtained when $n$ is 0. R, R°, R' and X are as defined hereinafter. R, R° and R' are preferably free of aliphatic carbon-to-carbon unsaturation.

The reaction is preferably carried out in a normally liquid solvent that does not, to any substantial extent, chemically combine with the reactants or products of the reaction. Organic nitrile solvents of this type and tetrahydrofuran have been found to be highly effective in producing chlorosilyl carbon compounds from trichlorosilane and carbonyl compounds such as aldehydes and ketones. Illustratively, organic nitrile solvents that can be used include acetonitrile, propionitrile, butyronitrile, valeronitrile, capronitrile, caprylonitrile, caprinitrile, lauronitrile, benzonitrile, tolunitrile and the like. Acetonitrile and tetrahydrofuran have been found to be highly useful as a solvent.

The trihalosilanes employed have one hydrogen atom bonded to silicon and can be depicted by the formula:

$$HSiX_3$$

wherein X is a halogen atom, such as, chlorine, bromine or iodine. Trichlorosilane, $HSiCl_3$, is the preferred reactant.

Typical of the carbon compounds containing oxygen bonded only to carbon that can be employed include carbonyl compounds such as aldehydes, ketones and carboxylic acid halides and can be represented by the formula:

$$\begin{array}{c} R \\ \phantom{R}\diagdown \phantom{O} \\ \phantom{RR}C=O \\ \phantom{R}\diagup \\ R° \end{array}$$

wherein R is selected from the class consisting of monovalent hydrocarbon groups and halogen-substituted monovalent hydrocarbon groups and R° is selected from the class consisting of hydrogen, halogen, monovalent hydrocarbon groups and halogen-substituted monovalent hydrocarbon groups.

Preferably, when R or R° is monovalent hydrocarbon or halogen-substituted monovalent hydrocarbon, it has one to 18, more preferably one to 12, carbon atoms. When R or R° is a halogen-substituted monovalent hydrocarbon group, such halogen is preferably chlorine. X is preferably chlorine.

Typical monovalent hydrocarbon groups as represented by R and R° include the alkyl groups, e.g., methyl, ethyl, propyl, butyl, pentyl, hexyl, octyl, nonyl, decyl, dodecyl, tetradecyl, hexadecyl, stearyl, isopropyl, isobutyl, isoamyl, neopentyl, neohexyl, neobutyl, and the like; the cycloalkyl groups, e.g., cyclopentyl, cyclohexyl, and the like; the aryl, alkaryl and aralkyl groups, e.g., phenyl, tolyl, naphthyl, xylyl, benzyl, ethylphenyl, phenylethyl, biphenylyl and the like. The term "aryl" or "diaryl" as used herein is intended to include alkyl-substituted as well as unsubstituted aryl groups.

Illustratively, carbon compounds containing oxygen bonded only to carbon include the aromatic ketones, composed of carbon, hydrogen and carbonyl oxygen with or without halogen substituents, such as, diaryl ketones and halogen-substituted diaryl ketones including benzophenone, p-methylbenzophenone, 4,4'-dimethylbenzophenone, benzoyl acetone, p-chlorobenzophenone, acetophenone and the like; aromatic aldehydes, composed of carbon, hydrogen and carbonyl oxygen with or without halogen substituents, such as arylene carbonals and halo-arylene aldehydes, including benzaldehyde, o-, m- and p-tolualde-hyde, phenylacetaldehyde, 2,6-dichlorobenzaldehyde, and the like; aromatic carboxylic acid halides, composed of carbon, hydrogen, carbonyl oxygen and halogen, such as arylformyl halides and halo-arylformyl halides, including benzoyl chloride, alpha-phenylacetyl chloride, diphenylacetyl chloride, triphenylacetyl chloride, beta-phenylpropionyl chloride, ortho-phenylbenzoyl chloride, ortho-, meta- and para-toluyl chloride, phenylacetyl chloride, ortho-, meta- and para-tolylacetyl chloride, and the like; aliphatic aldehydes and ketones composed of carbon, hydrogen and carbonyl oxygen with or without halogen substituents; and carbon oxides including carbon monoxide.

The tertiary amine, $R_3'N$, employed in the process of this invention preferably is a trialkylamine, such as, tri-n-propylamine, tri-n-hexylamine, triethylamine, tributylamine, trinonylamine and the like. Any tertiary amine that does not, to any substantial extent, chemically combine with the carbon compound reactant or the reaction products but combines with the hydrogen halide released during the reaction to form the tertiary amine hydrohalide may be used, such as, pyridine, picoline, collidine, quinoline and the like. It is convenient to select a tertiary amine which is soluble in the media in which the reaction takes place and the hydrochloride of which is insoluble in such media or precipitates when an extracting solvent, such as pentane or ether, is added during recovery operations after completion of the reaction.

In general, the reaction illustrated by the above equation can be conducted by mixing the trihalosilane, carbon compound reactant, and tertiary amine, with or without a solvent such as acetonitrile or tetrahydrofuran and maintaining the mixture at reaction temperature, e.g., about 0° C. or less to about 200° C., preferably about 25° C. to about 100° C. The reaction temperature is not narrowly critical and can be varied widely. The reaction is conveniently carried out by refluxing the mixture until the desired halosilyl carbon compound is formed. Refluxing can be conveniently conducted at atmospheric pressure, although higher or lower pressures can be employed. The reaction time also is not narrowly critical and can be varied over broad ranges. For example, times of as little as about one-half hour or less up to about 24 hours or more may be used. If desired, the reaction mixture can be stirred at room temperature (e.g., 25° to 30° C.) or lower for a period of time ranging from one-half hour or less to 2 hours or more before refluxing or otherwise raising the temperature to an elevated level.

The relative amounts of carbon compound reactant, trihalosilane and tertiary amine mixed to form the reaction mixture are not narrowly critical. Preferably, stoichiometric amounts up to a large excess of trihalosilane and/or tertiary amine can be employed. Thus, for each mole of carbonyl compound, preferably at least about two moles of trihalosilane are used in forming the reaction mixture. Although only as little as one mole of trihalosilane may chemically combine with one mole of the carbon compound reactant, an additional mole of trihalosilane is believed to be consumed in such cases in the reaction as shown in the above equation. Greater amounts of trihalosilane, for example, up to 8 or 10 moles per mole of carbon compound reactant can be used to form the reaction mixture, although about 2 to about 6 moles per mole of carbon compound reactant are referred. Lower amounts of trihalosilane may be employed although lower yields and longer reaction times may result.

The number of moles of tertiary amine per mole of carbon compound reactant also is not narrowly critical and can range from about 1 or far less to about 8 or more preferably about 1 to about 4, moles of tertiary amine per mole of carbon compound reactant.

The order in which the reactants are mixed is not narrowly critical, although it is usually preferred, because of the exothermic nature of the reaction, to control the reaction by the slow addition of the tertiary amine to a mixture of the trichlorosilane and carbon compound reactant. It also may be desirable to chill the reaction mixture during such addition as an aid to controlling the exothermic reaction. For this purpose also, it may be desirable to conduct the reaction in a suitable solvent as explained above. The amount of solvent is not narrowly critical and can vary over a wide range. Too small an amount of solvent could, of course, be of little effect in controlling the reaction and too much could, of course, render the reaction too sluggish. It is convenient to employ the solvent, if used, in amounts ranging from about 10 parts to about 500 parts, preferably about 50 parts to about 100 parts, by weight of solvent per 100 weight parts of trihalosilane, carbon compound reactant and tertiary amine in the reaction mixture.

The product halosilyl carbon compound can be recovered by any convenient means, such as by fractional distillation under reduced pressure or, especially if the product has a high boiling point, by rotary evaporation under reduced pressure. It is preferable to remove the tertiary amine hydrochloride by-product prior to recovering the halosilyl carbon compound product and this can be conveniently accomplished by adding a precipitant for the tertiary amine hydrochloride, such as ether or pentane, which dissolves the halosilyl carbon compound product and the remaining by-products.

The novel halosilyl carbon compounds of this invention can be represented by the formula

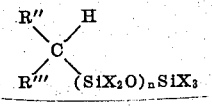

wherein R'' is selected from the class consisting of alkaryl groups aryl groups and haloaryl (e.g., 2,6-dihalophenyl) groups, R''' is selected from the class consisting of hydrogen and aryl groups and $n$ is 0 or 1. Typical monovalent hydrocarbon groups represented by R'' and R''' are as previously illustrated.

The halosilyl carbon compounds of this invention are useful in a wide variety of applications. By hydrolysis and condensation in accordance with well known techniques of hydrolyzing and condensing known halosilyl carbon compounds, the halosilyl carbon compounds disclosed herein form resinous siloxanes that are useful, for example, as protective coatings and potting compositions for electronic components. The halosilyl carbon compounds dislclosed herein can be cohydrolyzed and cocondensed with other halosilyl organic compounds to vary the properties desired in the resulting resinous siloxane to suit particular requirements for protective coatings, molding compositions and potting compositions made from such siloxanes. Also, the halosilyl carbon compounds can be further reduced with potassium hydroxide and ethanol to cleave the halosilyl groups and replace them with hydrogen thus forming the corresponding organic compound, for example, in a manner which might be explained by the equation:

$$R(R°)CH(SiX_2O)_nSiX_3 \rightarrow R(R°)CH_2 + (1+n)Si(OH)_4 + (3+2n)KX$$

The corresponding organic compounds are well known and have applications that are well known to those skilled in the art.

The following examples are presented in which, unless otherwise specified, all parts and percentages are on a weight basis, and all temperatures are on the Centigrade scale.

EXAMPLE 1

Preparation of benzyhydryltrichlorosilane from benzophenone

A dry three-necked flask equipped with reflux condenser, addition funnel, pot thermometer, and magnetic stirring bar was charged with 36.4 g (0.20 mole) benzophenone and 28.7 g. (0.20 mole) tri-n-propylamine. A slight positive nitrogen pressure was maintained in the system. The mixture was warmed until most of the benzophenone was taken into the liquid phase. Then 81.6 (0.60 mole) trichlorosilane was added dropwise over ten minutes, while the solution temperature was kept below 25° by means of an ice bath. The mixture was heated by an electric mantle; when the solution temperature reached 40°, a vigorous exothermic reaction took place, accompanied by the appearance of a bright yellow color. The heating mantle was removed, but the flask temperature continued to rise spontaneously. The solution began refluxing at 55°; the temperature increase continued for about 15 minutes, until 71° was reached. When the temperature started to decrease, the external heating was resumed. After an hour of refluxing, the solution temperature had leveled off at 75°.

The reaction may be depicted by the following equation:

$(C_6H_5)_2C=O + 2HSiCl_3 + (C_3H_7)_3N \rightarrow (C_6H_5)_2CHSiCl_3 + (C_3H_7)_3N \cdot HCl + 1/x(SiCl_2O)_x$ wherein $x$ is an integer of three, four or more.

The mixture was cooled and treated with 150 ml pentane, precipitating a massive crystalline solid. The suspension was filtered under anhydrous conditions; the solid which was filtered off was washed well with pentane, then dried in vacuo. This solid amounted to 35.7 g (99 percent yield) and was identified as tri-n-propylamine hydrochloride, m.p. 136°–138°.

The filtrate was distilled through a 150 mm Vigreux column. After removal of the pentane and excess trichlorosilane at atmospheric pressure, a colorless liquid was collected (4.1 g forerun, 120°–140° at 2.5 mm Hg reduced pressure and 53.5 g, 141°–145° at 2.5 mm Hg reduced pressure). Both fractions solidified on standing. After vapor phase chromatographic purification (both fractions contained two impurities totaling about 4 percent) a crytalline solid, m.p. 48°–49°, was obtained. The 57.6 g distillate corresponded to a 95 percent yield of benzhydryltrichlorosilane. The distillate had an elemental analysis of: Calcd. for $C_{13}H_{11}SiCl_3$ : % C, 51.76; H, 3.68; Si, 9.31; Cl, 35.26. Found: %C, 51.68; H, 3.78; Si, 9.09; Cl, 35.60. Infra red and nuclear magnetic resonance confirmed the identify of the distillate product as benzhydryltrichlorosilane, $(C_6H_5)_2CHSiCl_3$.

The distillation residue was 16.4 g of a resinous oil containing ≡SiCl, the infra red spectrum of which was dominated by the SiO absorption at 8.5 to 9.5 microns, and was designated as the dichlorosiloxane cyclic polymer, $(SiCl_2O)_x$, where $x$ is an integer of three, four or more

EXAMPLES 2 THROUGH 5

The process of Example 1 was carried out four more times using, in place of benzophenone on a mole for mole basis, respectively, p-chlorobenzophenone, p-$ClC_6H_4COC_6H_5$(Example 2), p-methylbenzophenone, p-$CH_3C_6H_4COC_6H_5$ (Example 3), benzaldehyde, $C_6H_5CHO$ (Example 4), and 2,6-dichlorobenzaldehyde, 2,6-$Cl_2C_6H_3CHO$ (Example 5). In Examples 2, 4 and 5 the molar ratio of tri-n-propylamine to carbonyl compound was 1:1 as in Example 1 whereas in Example 3 slightly more tri-n-propylamine was used such that the molar ratio of it to carbonyl compound was 1.2:1. In Example 2 no solvent was used; however, in Examples 3, 4 and 5 acetonitrile was used in an amount of one gram per gram of carbonyl compound. In each case, the reaction temperatures and reaction times correspondingly given in Table I were employed. The halosilyl carbon compound products listed in Table I below were separated by distillation at the temperatures and pressures also correspondingly listed. Table I also sets forth the yields of each halosilyl carbon compound and the yield of the tri-n-propylamine hydrochloride by product obtained in each Example. In each case the identity of the halosilyl carbon compound product was verified by elemental analysis, infra red spectra and nuclear magnetic resonance spectra. In each case the dichlorosiloxane cyclic polymer $(SiCl_2O)_x$, remained as a residue after distillation.

TABLE I

| Ex. | Product | Reaction conditions °C. hr. | Boiling conditions °C. mmHg | Product Yield % | Yield of Tert. Amine HCl, % |
|---|---|---|---|---|---|
| 2 | p-Chlorobenzy-hydryltri-chlorosilane p-$ClC_6H_4CH(C_6H_5)SiCl_3$ | 52–77  1 | 161–164  2 | 95 | 97 |
| 3 | p-Methylbenzhy-dryltrichloro-silane p-$CH_3C_6H_4CH(C_6H_5)SiCl_3$ | 60–67  24 | 138–140  2 | 88 | quant. |
| 4 | Alpha-chloro-benzyltri-chlorosilane $C_6H_5CHClSiCl_3$ Benzyltri-chlorosilane $C_6H_5CH_2SiCl_3$ | 57–58  1 | 115–120 12 82–84  8 | 42 5* | 95 |
| 5 | 2,6-Dichloro-benzyltri-chlorosilane 2,6-$Cl_2C_6H_3CH_2SiCl_3$ | 51–64  2 | 132–140  4 | 61 | 87 |

*Determined by gas-liquid phase chromatography; all other yields were determined on isolated products or isolated tert. amine HCl by-product.

EXAMPLE 6

The process of Example 1 was carried out using, in place of benzophenone on a mole for mole basis, benzoyl chloride and using a molar ratio of 1.25 moles of trichlorosilane per mole of carbonyl compound instead of the molar ratio of Example 1 of 3 moles of trichlorosilane per mole of carbonyl compound. The reaction solution was held at about 25° C. for 1 hour and then its temperature was raised to and held at 85° C. for 0.5 hour instead of the reaction conditions of one hour at 55° to 75° C. used in Example 1. Also, two gram of acetonitrile per gram of carbonyl compound was used as a solvent in the reaction solution. Using the procedures of Example 1, tri-n-propylamine hydrochloride was recovered in substantially quantitative yield. The filtrate upon distillation yielded, at 115°–120° C. and 12 mmHg reduced pressure, alpha-chlorobenzyltrichlorosilane, $C_6H_5CHClSiCl_3$, in a yield of 91 percent.

The identity of the product was verified by infra red spectrum, magnetic nuclear resonance spectrum and elemental analysis. The dichlorosiloxane cyclin polymer, $(SiCl_2O)_x$, remained as a residue after distillation.

EXAMPLE 7

The general procedure of Example 1 was used to react benzoyl chloride, trichlorosilane and tri-n-propylamine in the respective mole ratio of 11 to 3 to 1. The reaction was carried out in tetrahydrofuran solvent in an amount of 3 gram per gram of benzoyl chloride for 4 hours at temperatures ranging from −40° to +25° C. The by-product, n-$(C_3H_7)_3N·HCl$, was separated in a 94 percent yield using the procedure of Example 1. Upon distillation of the filtrate there was obtained a 59 percent yield of the product identified as (alpha-chlorobenzyl)(trichlorosiloxy)dichlorosilane, $C_6H_5CH(Cl)SiCl_2OSiCl_3$, which boiled at 110° C. under 2 mm Hg reduced pressure. Elemental analysis, infra red analysis and nuclear magnetic resonance veified the identify of the product.

The product was dissolved in acetonitrile to form a 50 percent solution to which there was added 0.03 gram of tri-n-propylamine per gram of said product. The resulting solution was refluxed (84° C.) for 1 hour to produce an 85 percent yield of alpha-chlorobenzyltrichlorosilane, $C_6H_5CH(Cl)SiCl_3$, and after distillation leaving a residue of dichlorosiloxane cyclic polymer, $(SiCl_2O)_x$. This example supports the intermediacy of the trichlorosiloxy compound, $C_6H_5CH(Cl)SiCl_2OSiCl_3$.

What is claimed is:

1. A process for the reductive silylation of the carbonyl group of a carbon compound containing a carbonyl group which process comprises reacting, under substantially anhydrous conditions and in the presence of a tertiary amine, (a) a carbon compound containing a carbonyl group, said carbon compound being selected from the group consisting of aldehydes, ketones, and carboxylic acid chlorides with (b) a trihalosilane having the formula:

$HSiX_3$ wherein X is halogen, to effect replacement of one carbon to oxygen bond of the carbonyl group of the carbon compound by a carbon to silicon bond and replacement of the second carbon to oxygen bond of the carbonyl group by a carbon to hydrogen bond or by a carbon to halogen bond.

2. Process as claimed in claim 1 wherein said carbon compound is a carbonyl compound represented by the formula:

wherein R is selected from the class consisting of monovalent hydrocarbon groups and halogen-substituted monovalent hydrocarbon groups and R° is selected from the class consisting of hydrogen, halogen, monovalent hydrocarbon groups and halogen-substituted monovalent hydrocarbon groups, and the halosilyl carbon compound product is represented by the formula:

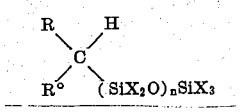

wherein $n$ is an integer of 0 to 1 and X is halogen.

3. Process as claimed in claim 2 wherein said trihalosilane is trichlorosilane and R and R° are selected from the class consisting of aryl and chlorine-substituted aryl groups.

4. Process as claimed in claim 2 wherein said trihalosilaine is trichlorosilane and R is selected from the class consisting of aryl and chlorine-substituted aryl groups and R° is hydrogen.

5. Process as claimed in claim 2 wherein said trihalosilane is trichlorosilane, R is selected from the class consisting of aryl and chlorine-substituted aryl and R° is chlorine.

6. Process as claimed in claim 2 wherein said reaction is carried out in a normally liquid organic nitrile solvent which does not substantially chemically combine with the reactants or products of said process.

7. Process as claimed in claim 6 wherein said trihalosilane is trichlorosilane.

8. Process as claimed in claim 7 wherein said solvent is an alkane nitrile.

9. Process as claimed in claim 8 wherein said solvent is acetonitrile.

10. Process as claimed in claim 9 wherein said tertiary amine is a trialkylamine.

11. Process as claimed in claim 9 wherein said carbonyl compound is a diarylketone and said halosilyl carbon compound is diarylmethyltrichlorosilane.

12. Process as claimed in claim 11 wherein said diarylketone is benzophenone and said halosilyl carbon compound is benzhydryltrichlorosilane.

13. Process as claimed in claim 11 wherein said diarylketone is p-methylbenzophenone and said halosilyl carbon compound is p-methylbenzhydryltrichlorosilane.

14. Process as claimed in claim 9 wherein said carbonyl compound is a halogen-substituted diarylketone and said halosilyl carbon compound is halogen-substituted diarylmethyltrichlorosilane.

15. Process as claimed in claim 14 wherein said carbonyl compound is p-chlorobenzophenone and said halosilyl carbon compound is p-chlorobenzhydryltrichlorosilane.

16. Process as claimed in claim 9 wherein said carbonyl compound is an aryl aldehyde and said halosilyl carbon compound is an arylchloromethyltrichlorosilane.

17. Process as claimed in claim 16 wherein said carbonyl compound is benzaldehyde and said halosilyl carbon compound is alphachlorobenzyltrichlorosilane.

18. Process as claimed in claim 9 wherein said carbonyl compound is a halo-aryl aldehyde and said halosilyl compound is a halo-arylmethyltrichlorosilane.

19. Process as claimed in claim 18 wherein said carbonyl compound is 2,6-dichlorobenzaldehyde and said halosilyl carbon compound is 2,6-dichlorobenzyltrichlorosilane.

20. Process as claimed in claim 9 wherein said carbonyl compound is an arylformyl halide and said halosilyl carbon compound is an arylchloromethyltrichlorosilane.

21. Process as claimed in claim 20 wherein said carbonyl compound is benzoyl chloride and said halosilyl carbon compound is alpha-chlorobenzyltrichlorosilane.

22. A halosilyl carbon compound having the formula:

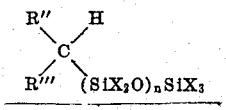

wherein R" is an alkaryl, or haloaryl group, R''' is an aryl group, $n$ is 0 or 1 and X is halogen.

23. Halosilyl compound as claimed in claim 22 having the formula: $p\text{-}ClC_6H_4CH(C_6H_5)SiCl_3$.

24. Halosilyl compound as claimed in claim 22 having the formula: $2,6\text{-}Cl_2C_6H_3CH_2SiCl_3$.

25. A process as claimed in claim 1 wherein replacement of the second carbon to oxygen bond of the carbonyl group of the carbon compound by a carbon to hydrogen bond is effected.

26. A process as claimed in claim 1 wherein replacement of the second carbon to oxygen bond of the carbonyl group of the carbon compound by a carbon to chlorine bond is effected.

27. A halosilyl carbon compound having the formula:

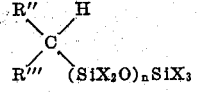

wherein R" is an alkaryl, aryl or haloaryl group, R''' is an aryl group, a halogen atom or a hydrogen atom, X is halogen and $n$ is 1.

28. A compound as claimed in claim 27 wherein R''' is an aryl group, a chlorine atom or a hydrogen atom and X is chlorine.

29. A halosilicon compound as claimed in claim 27 having the formula:

$$C_6H_5CH(Cl)SiCl_2OSiCl_3.$$

30. Halosilyl compound as claimed in claim 22 having the formula: $p\text{-}CH_3C_6H_4CH(C_6H_5)SiCl_3$.

31. A compound as claimed in claim 22 wherein $n$ is 0 and X is chlorine.

32. A halosilyl carbon compound having the formula:

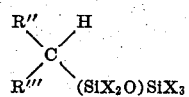

wherein R'' is an alkaryl, or a haloaryl group, R''' is a halogen atom, X is halogen, and $n$ is 0 or 1.

33. A compound as claimed in claim 32 wherein R''' is a chlorine atom, X is a chlorine atom and $n$ is 0.

34. A halosilyl carbon compound having the formula:

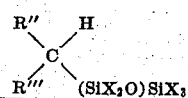

wherein R'' is a 2,6-dihalophenyl group, R''' is an aryl group, a halogen atom or a hydrogen atom, X is halogen and $n$ is 0 or 1.

35. A compound as claimed in claim 34 wherein R'' is a 2,6-dichlorophenyl group, R''' is an aryl group, a chlorine atom or a hydrogen atom, $n$ is 0 and X is chlorine.

36. A halosilyl carbon compound having the formula:

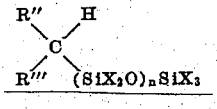

wherein R'' is a 2,6-dihalophenyl group, R''' is an aryl group, a halogen atom or a hydrogen atom and X is halogen.

* * * * *